United States Patent [19]

Bleha, Jr. et al.

[11] 4,378,955

[45] Apr. 5, 1983

[54] METHOD OF AND APPARATUS FOR A MULTIMODE IMAGE DISPLAY WITH A LIQUID CRYSTAL LIGHT VALVE

[75] Inventors: William P. Bleha, Jr.; Eliezer Wiener-Avnear, both of Carlsbad; Paul F. Robusto, Oceanside, all of Calif.

[73] Assignee: Hughes Aircraft Company, Culver City, Calif.

[21] Appl. No.: 279,283

[22] Filed: Jun. 30, 1981

Related U.S. Application Data

[63] Continuation of Ser. No. 63,649, Aug. 3, 1979, abandoned.

[51] Int. Cl.$^3$ .............................................. G02F 1/133
[52] U.S. Cl. .................................. 350/334; 350/347 E
[58] Field of Search .................. 350/342, 347 E, 337, 350/334

[56] References Cited

U.S. PATENT DOCUMENTS

| | | | |
|---|---|---|---|
| 3,694,053 | 9/1972 | Kahn | 350/347 E |
| 3,784,280 | 1/1974 | Bigelow | 350/347 E |
| 3,785,721 | 1/1974 | Harsch | 350/347 E |
| 4,019,807 | 4/1977 | Boswell et al. | 350/342 |
| 4,127,322 | 11/1978 | Jacobson et al. | 350/342 X |

OTHER PUBLICATIONS

Goscianski, "Optical Characteristics of Twisted Nematic Liquid Crystals; Application to the Improvement of the Scanning Capability Inmatrix Displays", *Journal of Applied Physics*, vol. 48, pp. 1426-1431, Apr. 1977.
Shimomjura et al., "Voltage Controllable Color Formation with a Twisted Nematic Liquid Crystal Cell", *Japan, J. Appl. Phys.*, vol. 14, pp. 1093-1094, 1975.

*Primary Examiner*—John K. Corbin
*Assistant Examiner*—David Lewis
*Attorney, Agent, or Firm*—Robert M. Wallace; William J. Bethurum; William H. MacAllister

[57] ABSTRACT

Method of and apparatus for operating an image display system using a hybrid field effect liquid crystal light valve of the type wherein the molecules of the nematic liquid crystal layer are helically twisted through an acute angle. A polarized projection beam is oriented with its polarization direction within the acute twist angle and applied to a reflective face of the light valve. A writing light input image is applied to a photoresponsive opposite face in order to modulate the reflected projection beam. An electric field applied across the light valve is adjusted between two levels to produce either a simultaneous display of multicolor symbology and achromatic (black-white) gray scale images or a separate display of either one of them.

27 Claims, 9 Drawing Figures

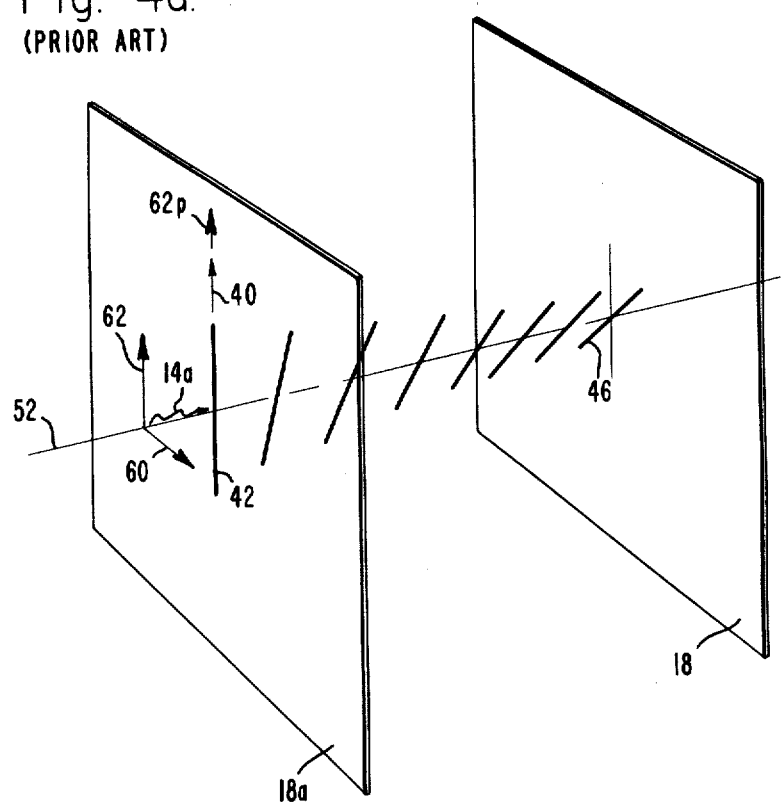

METHOD OF AND APPARATUS FOR A MULTIMODE IMAGE DISPLAY WITH A LIQUID CRYSTAL LIGHT VALVE

This is a continuation of application Ser. No. 63,679, filed Aug. 3, 1979, now abandoned.

TECHNICAL FIELD

This invention relates generally to light valve image display systems, and in particular to liquid crystal light valve systems which display multi-color symbology and blue-black and white gray scale images.

BACKGROUND ART

Light amplifier systems which are capable of projecting bright, dynamic images having color symbology superimposed on achromatic (blue-black and white) gray scale images are desirable for a variety of applications. The term "achromatic" is intended to include a gray scale which has a slight blue tint. The achromatic gray scale mode is applicable to large scale projection of television images. The color symbology mode is applicable to the display of symbology such as maps, titles, graphs, and grids. Such a color display can be used either separately or superimposed on the gray scale imagery for group presentations, head-up displays and the like. The color symbology can also be used to enhance the contrast of images such as produced by medical and scientific photography by converting the various levels of the gray scale into colors. The desirability of such systems has led to the development of liquid crystal light valves and in particular the photoactivated liquid crystal light valve. As is well known, this type of device is a thin film multilayer structure comprising a liquid crystal layer, a dielectric mirror, and a photoresponsive layer sandwiched between two transparent electrodes. A polarized projection beam is directed through the liquid crystal layer and to the dielectric mirror. A writing light input image is applied to the photoresponsive layer, thereby switching the electric field across the electrodes onto the liquid crystal layer to activate the liquid crystal. The activated liquid crystal in turn modulates the polarization state of the reflected projection beam. The reflected beam passes through an analyzer to create an intensity modulated beam which is projected by a lens onto a viewing screen. The intensity of the projected image has a point-to-point correspondence to the intensity of the writing light input image.

This operation is further described in U.S. Pat. No. 4,127,322, issued to A. D. Jacobson, et al, entitled "High Brightness Field High Brightness Full Color Image Light Valve Projection System" on Nov. 28, 1978, and U.S. Pat. No. 4,019,807 issued to D. D. Boswell, et al on Apr. 26, 1977, entitled "A Reflective Liquid Crystal Light Valve with Hybrid Field Effect Mode". Both patents are assigned to the assignee of the present invention.

The above-referenced Jacobson patent disclosed an optical system for projection of high brightness, full color television images onto a display screen from three field effect light valves. Provision was made to superimpose the color symbology image onto the full color image using a fourth light valve. By contrast, the present invention is directed to a system for display of black-white television images and/or a color symbology overlay which uses only a single light valve. The particular type of liquid crystal light valve used and disclosed in the Jacobson patent was also described in the article by Grinberg, Jacobsen et al entitled "Photoactivated Birefringent Liquid Crystal Light Valve for Color Symbology Display" and published in *IEEE Transactions on Electron Devices*, Vol. ED-22, No. 9, Sept., 1975, pp. 775-83. The device described in that patent and journal article projected a large scale display of color symbology and achromatic gray scale imagery from a single light valve operating in the field effect mode. That mode was achieved by homeotropic (perpendicular to the cell walls) alignment of the long axes of the liquid crystal molecules in the dark "off state" (electric field off the liquid crystal) and tilting of the long axes of the molecules in the transmitting "on state" (electric field switched on to the liquid crystal in response to the writing light applied to the photoresponsive layer). The homeotropic alignment was achieved by an alignment mechanism built into the cell walls containing the liquid crystal layer. During the course of further development of this device, it was discovered that the lifetime of the homeotropic alignment was limited to an extent that precluded its use in some commercial applications.

The above-referenced Boswell patent disclosed a hybrid field effect liquid crystal light valve for projection of monochromatic, i.e., blue, green or red, gray scale imagery at video rates. In operation, the dark off-state is created by rotation of the polarization of a twisted nematic structure of the liquid crystal and the transmitting on-state by the birefringence of the tilted molecules. Although possessing the advantages of high brightness, high contrast and time response suitably fast for television images, the device also has a number of limitations, among them being its inability to project black-white gray scale images as well as its inability to produce a color symbology mode on the monochromatic gray scale mode. Moreover, the device is difficult to fabricate because the thickness of the liquid crystal layer must be precisely tuned to match the color of the monochromatic projection light with which it is used in order to provide a high contrast image.

Bleha, Grinberg, Jacobson and Myer, in an article entitled, "The Use of the Hybrid Field Effect Mode Liquid Crystal Light Valve with Visible Spectrum Projection Light", published in the 1977 Society for Information Display (SID) International Symposium, Digest of Technical Papers, May, 1977, pp. 104-105, extended the design of the hybrid field effect device to include a liquid crystal layer having a thickness greater than was heretofore used. The article discloses that in a thickness range from 3 to 12 microns the thickness of the liquid crystal no longer has to be precisely tuned in order to display monochromatic gray scale images. The article also discloses that multicolor symbology can be produced by increasing the thickness of the liquid crystal layer to 6.0 microns or greater. However, as the authors point out in the article, the gray scale images are limited to monochromatic or non-neutral colors. Furthermore, because the time response of the liquid crystal layer varies as the square of its thickness, the multicolor symbology device is too slow to produce video rate images.

SUMMARY OF THE INVENTION

It is an object of the present invention to provide a method of and apparatus for operating an image display system using a hybrid field effect liquid crystal light valve to display a high brightness achromatic gray scale image.

It is a further object to provide such a method and apparatus which can superimpose a color symbology display on an achromatic gray scale image.

Another object is to provide such an image display system which can project a color symbology display and an achromatic gray scale image at TV repetition rates.

A still further object is to provide a liquid crystal light valve image display device which provides a high contrast achromatic gray scale image without the need for precise control of the liquid crystal layer thickness.

These and other objects and advantages are achieved by an improved image display system using a hybrid field effect liquid crystal light valve of the type described in the above-identified U.S. Pat. No. 4,109,807 by Boswell, et al, wherein the molecules of the nematic liquid crystal layer are twisted in a helical manner through an acute twist angle. A polarized projection beam, oriented with its polarization direction within the acute angle of the twisted nematic liquid crystal structure, is applied to a reflective face of the light valve. An input image applied to a photoresponsive opposite face causes the liquid crystal material to spatially modulate the polarization rate of the projection beam. An analyzer located in the projection beam reflected from the light valve transmits only light in a given polarization state. Adjusting an electric field applied across the light valve between two levels results in the projection beam displaying an achromatic blue-black and white gray scale image overlaid with a multicolor symbology image or a separate display of either one of them. As defined herein, an achromatic image is one which has nearly same color as the color of projection light incident on the light valve device, and includes, as previously stated, a gray scale image which has a slight blue tint. Thus, an image is achromatic if a white projection light will produce a blue-black and white image. Of course, it follows that a projection light of any component color, e.g. red, will produce an image in the component color, red.

BRIEF DESCRIPTION OF THE DRAWINGS

These and other objects, advantages, and features of the invention will be more fully apparent from the following detailed description taken in conjunction with the accompanying drawings wherein like referenced characters refer to like parts throughout and in which:

FIG. 4a illustrates in perspective view the orientation of the twisted nematic light crystal configuration relative to the crossed analyzer and polarizer in the prior art liquid crystal light valve of FIG. 1;

DETAILED DESCRIPTION OF THE INVENTION

The above referenced Boswell patent discusses in detail the construction, theory, and operation of the hybrid field effect liquid crystal light valve used in the present invention. This patent is incorporated by reference herein.

Figure 1:
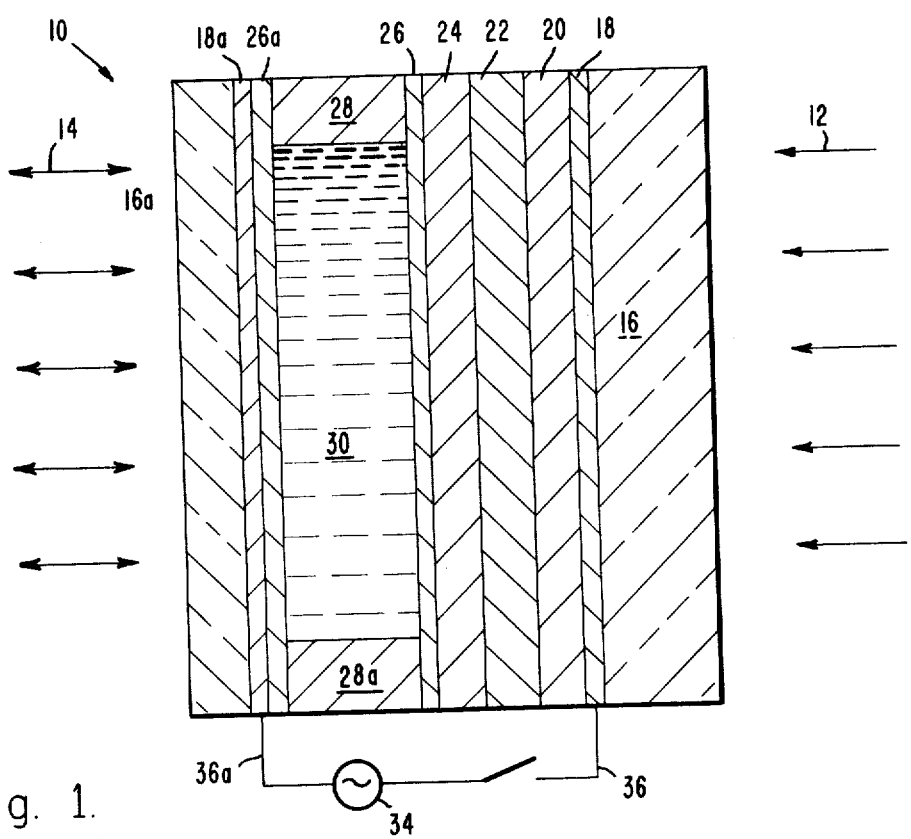
FIG. 1 is a sectional view of a prior art hybrid field effect light valve of the type which is employed in the present invention and disclosed in U.S. Pat. No. 4,019,807 issued to D. Boswell, et al.

A brief description of a light valve such as that patented by Boswell will now be presented with reference to FIGS. 1 through 4a in order to provide an understanding of the present invention. FIG. 1 is a cross-sectional view of a hybrid field-effect light valve, essentially as it appears in FIG. 1 of the Boswell patent. A writing light input beam 12 modulates the polarized projection light beam 14 by means of a light valve 10. The light valve includes a transparent glass substrate 16 on which is deposited a thin transparent conductor 18 typically of indium-tin-oxide, followed by a thin layer 20 of photoresponsive material such as cadmium sulfide. On top of this layer is a thin film light-blocking layer 22 such as cadmium telluride and a multilayered dielectric mirror 24 which, in combination, prevent the projection light beam 24 from reaching the photoresponsive layer 20. The high resistance of the dielectric mirror 24 blocks the flow of direct current to the liquid crystal layer 30, thereby requiring operation of the device with alternating voltage. Over the mirror layer 24 is an inert insulating layer 26, such as silicon dioxide, which prevents chemical, electrochemical, or mechanical interaction with the liquid crystal material. There is also a counter-electrode which consists of a glass counter-substrate 16a similar to substrate 16 on which is deposited a counter electrode 18a similar to electrode 18, followed by an inert insulating layer 26a similar to insulating layer 26. Confined within the space defined by the two insulating layers 26 and 26a and insulating spacers 28 and 28a is a nematic liquid crystal layer 30. This layer is typically from two to four microns thick and can consist of commercially available a biphenyl material. The insulating layers 26 and 26a also provide a means for aligning the liquid crystal as will be described in greater detail hereinafter. An adjustable low voltage, audio frequency, bias voltage supply 34 is connected by leads 36 and 36a to the electrodes 18 and 18a.

The liquid crystal molecules in the light valve of FIG. 1 are aligned in a twisted alignment configuration in the dark "off-state". In this configuration, the molecules are aligned with their long axes parallel to the electrode surfaces. In addition, the long axes of the molecules adjacent to each electrode are oriented in a preferred direction that is fabricated into each electrode surface. The twisted (helical) alignment configuration is obtained by orienting the preferred direction on the two parallel opposed electrode surfaces such that the respective directions intersect at an acute angle when orthogonally projected onto a plane parallel to the two surfaces. As a result, the molecules in the bulk of the liquid crystal layer twist through this angle to form a partial helix whose axis is perpendicular to the two electrodes.

Figure 2:
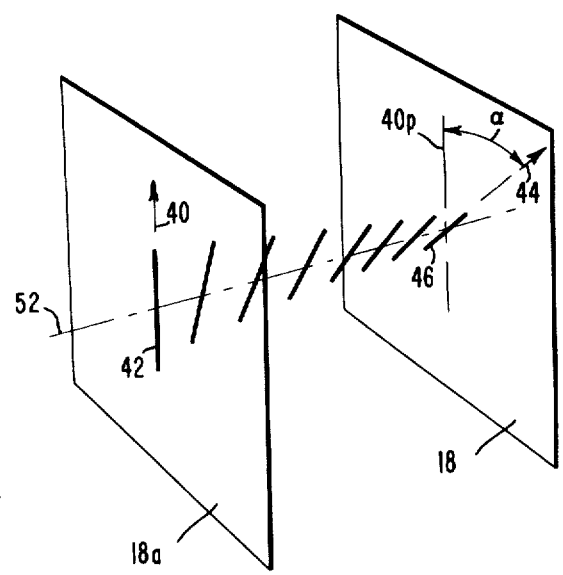
FIG. 2 is a schematic perspective view of the type of twisted nematic liquid crystal configuration used in the off-state of the light valve of FIG. 1.

FIG. 2 is a schematic perspective view of the above-described twisted nematic liquid crystal configuration. The arrow 40 in the plane of electrode of 18a represents the preferred orientation direction for the long axes 42 of molecules adjacent to electrode 18a. Similarly, the arrow 44 in the plane of electrode 18 represents the preferred orientation direction for the long axes 46 of molecules adjacent to electrode 18. The broken line 40p in the plane of electrode 18 represents the orthogonal projection of arrow 40 onto the plane of electrode 18. The intersection of line 40p and arrow 44 forms an acute angle α. The long axes of the intermediate molecules are parallel to the planes of electrodes 18 and 18a and progressively twist through the acute angle along the axis 52 perpendicular to electrodes 18 and 18a. Prior hybrid field-effect light valves use a 45° twist angle. In the preferred embodiment of the invention to be described below, the angle is also 45°, but other acute angles may be used.

Prior art alignment techniques for orienting molecules in these preferred directions include preparation of the substrate surfaces in contact with the liquid crystal material by shallow angle ion beam etching, grazing angle deposition of inert insulating material or mechanical rubbing of the inert layers 26 and 26a.

The operation of both the prior art hybrid field effect light valve and of the invention to be described use the two electro-optical effects of optical birefringence and optical activity. Prior to describing the operation of these devices, a brief discussion of the well-known theory of birefringence and optical activity will be presented.

Optical birefringence is a phenomenon in which the polarization of light changes its state, for example, from linear to elliptical to circular and back to linear, as it traverses an optically anisotropic material. Nematic ("rod-like") liquid crystal molecules are optically anisotropic, meaning the index of refraction along their long axes is different from that along their short axes. The index of refraction along the long axis of the molecule is called the extraordinary index ($n_e$) whereas that along the short axis is called the ordinary index of refraction ($n_o$). The difference between the extraordinary and the ordinary index is termed the birefringence of the material, $\Delta n$. With all the molecules in a layer of liquid crystal material physically aligned with respect to one another, that is, with all their long axes parallel, if linearly polarized light is directed through the material with the direction of the polarization of the light entirely along either the long or short axis of the molecule, no change occurs in the polarization of the light as it traverses the liquid crystal. However, if the direction of polarization of the light has a component along the short axis and a component along the long axis, then the state of polarization of the light will change as the light traverses the material.

Optical activity is the phenomenon in which linearly polarized light has its direction of polarization rotated while remaining linearly polarized as it traverses the liquid crystal material.

Figure 3A:
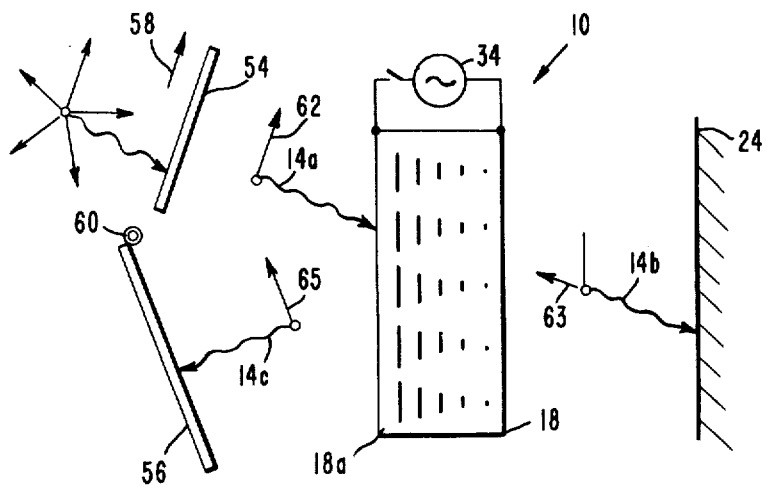
FIGS. 3a and 3b, respectively, illustrate the off-state and on-state operation of the prior art liquid crystal light valve of FIG. 1.
Figure 3B:
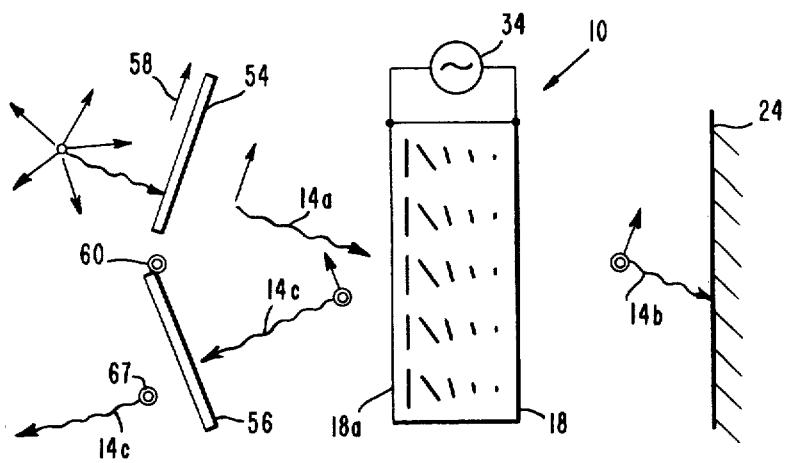

FIGS. 3a and 3b respectively illustrate the operation of the dark off-state and transmitting on-state of the prior art liquid crystal light valve of FIG. 1. In FIG. 3a, a polarizer 54 is placed between a source of unpolarized light and the light valve 10 and an analyzer 56 is placed within the path of the reflected beam 14c from the dielectric mirror 24, here shown as separate for clarity of illustration.

A dark off-state occurs when the optical activity exhibited by the twisted nematic structure causes the direction of polarization 62 of the linearly polarized incident light 14a to rotate through the 45° twist angle of the liquid crystal so that the exiting light 14b has polarization direction 63. Upon reflection from the dielectric mirror 24, the light 14b retraverses the liquid crystal and its direction of polarization 63 is rotated in the opposite direction, thereby returning to the polarization direction 65 of the incident light. Thus, the analyzer, havings its axis 60 perpendicular to the polarizer axis 58, blocks the linearly polarized reflected beam 14c to produce a dark off-state.

The more complex on-state is shown in FIG. 3b. The liquid crystal has positive dielectric anisotropy so that the long axes of liquid crystal molecules tend to align along an applied electric field. Thus, as voltage is applied to the liquid crystal (as by applying a writing light input image to the photoresponsive layer of the light valve), the molecules begin to tilt toward the perpendicular to the electrode surfaces and untwist about the axis 52 (shown in FIG. 2). The untwisting tends to unwind the helix as the applied voltage increases. A detailed description of this tilt and untwisting of the liquid crystal is given in the Boswell patent and will not be repeated here. This reorientation of the molecules changes the ratio of polarization components of light along the short and long axes of the molecules thereby also changing the birefringence, $\Delta n$. As a result of interference between these two polarization components, the light 14c that emerges from the light valve 10 is elliptically, rather than linearly, polarized and the polarization component 67 oriented parallel to the polarization axis 60 of the analyzer 56 will be transmitted.

At sufficiently high voltages the molecular orientation changes to homeotropic. The birefringence of the liquid crystal is then zero because the polarization direction of the light is perpendicular to the long axes of the molecules. As a result, the polarization is unaffected and the transmission again will be zero. However, between the off-state and the maximum on-state there is a range of intermediate voltages for which the molecular orientation is not completely homeotropic, and for which the transmission varies with voltage.

In the prior art method of operating the hybrid field effect light valve, the polarization direction of the incident light beam is either parallel or perpendicular to the preferred molecular orientation direction fabricated on the entrance electrode. FIG. 4a illustrates in perspective view this prior art polarization direction of incident light relative to the hybrid field effect liquid crystal light valve. The arrow 62 is the polarization direction of the polarized incident projection beam 14a. Arrow 60, the polarization axis of the analyzer, is perpendicular to the polarization direction arrow 62. Arrow 62p is the plane of electrode 18a, representing the orthogonal projection of arrow 62 onto the plane of electrode 18a, is parallel to the preferred orientation direction 40 of the long axes of the liquid crystal molecules 42 adjacent electrode 18a. An equivalent orientation is with the incoming polarization direction 62 perpendicular to the long axes of the lquid crystal molecules. The prior art teaches that this orientation is necessary to produce minimum transmission in the off-state and hence to give high contrast with the projection light transmitted in the on-state.

The type of prior art light valve described thus far has the limitations described in the background art portion of the specification of monochromatic (colored) rather than achromatic (black-white) gray scale image display, no capability for simultaneous display of color symbology and gray scale imagery. The improved operation of the present invention stems from a novel orientation of the twisted nematic liquid crystal light valve relative to the crossed polarizer and analyzer. This orientation is obtained by rotating the liquid crystal light valve relative to the crossed polarizer and analyzer so that the polarization direction of the projection beam incident on the entrance electrode falls within the acute angle of the twisted nematic liquid crystal. That is to say, as may be seen in FIG. 4b, in which the lines 40p and 44 respectively represent the preferred orientation directions of the long axes of molecules adjacent to electrodes 18a and 18, the angle $\beta$ between arrow 62p (representing the orthogonal projection of the polarization direction 62 of the incident beam 14a on the electrode 18), and 40p and the angle $\gamma$ between arrow 62p and 44 are each greater than 0° and their sum is equal to the twist angle $\alpha$. In a preferred embodiment of the present invention, $\alpha=45°$, and the arrow 62p bisects $\alpha$ to form the angles $\beta=\gamma=22.5°$.

Figure 4B:
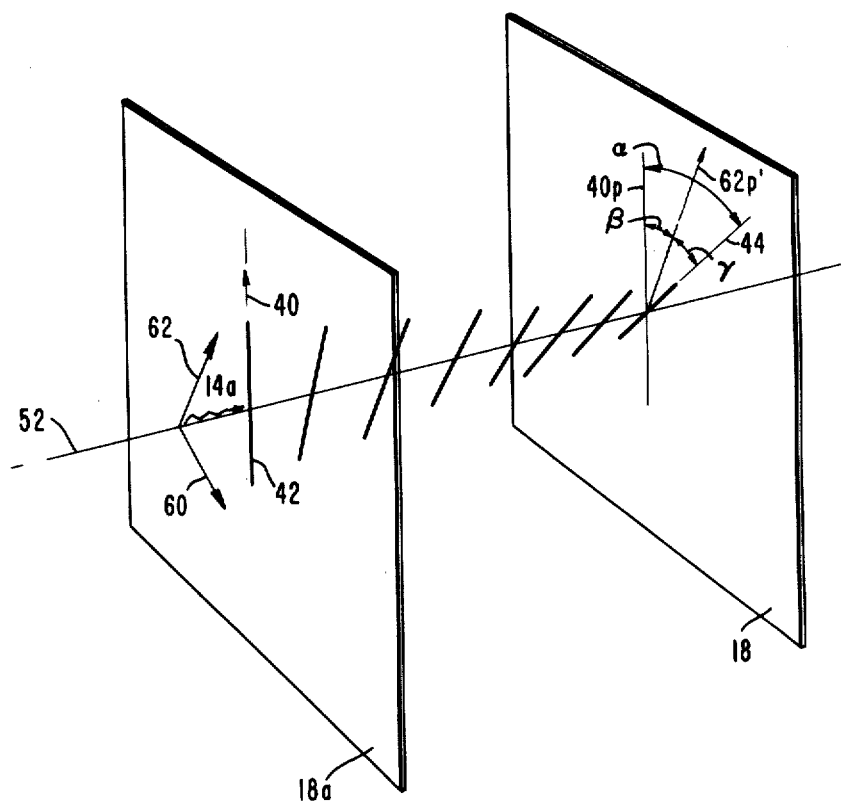
FIG. 4b illustrates in perspective view the orientation of the twisted nematic liquid crystal configuration relative to the crossed analyzer and polarizer in a liquid crystal light valve operated in accordance with the present invention.
Figure 5A:
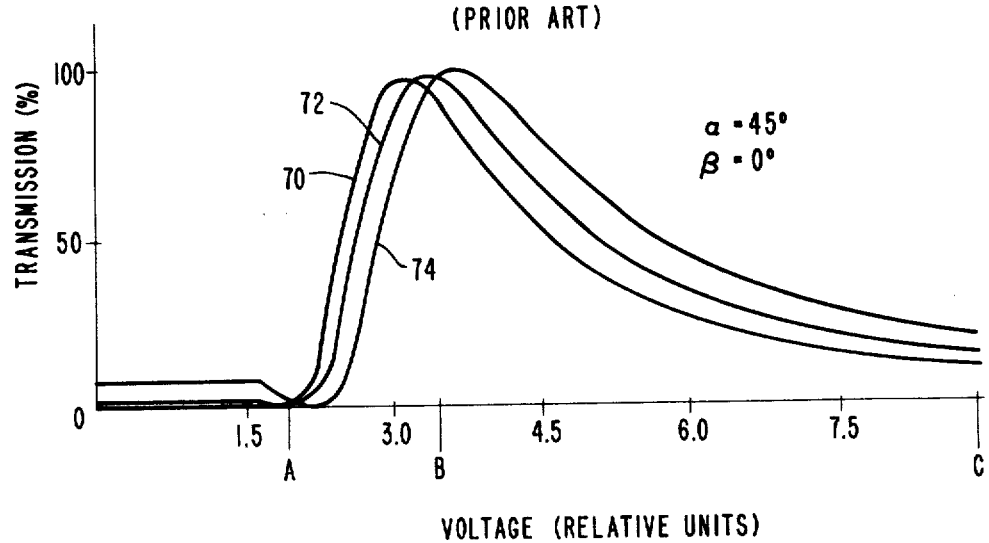
FIGS. 5a and 5b are graphs respectively illustrating for the prior art and for the present invention the percentage of projection light transmitted as a function of applied voltage for the primary colors of red, green and blue.
Figure 5B:
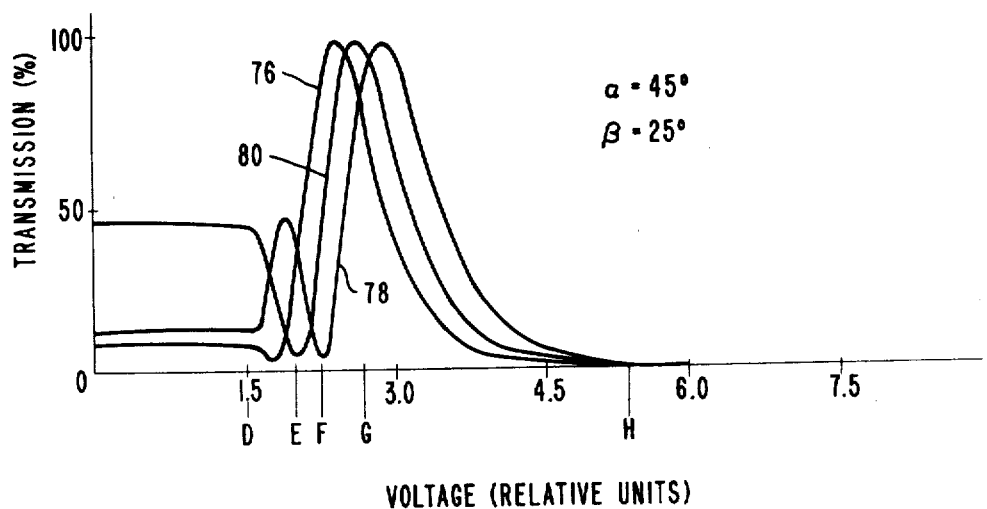

The advantageous effect of the novel orientation shown in FIG. 4b may be understood by reference to FIGS. 5a and 5b, which respectively show curves, generated by a numerical computer model, characterizing the conventional hybrid field effect device and the present invention. In each of FIGS. 5a and 5b the vertical axis represents percentage transmission of the projection light incident on the liquid crystal device and the horizontal axis represents voltage applied across the liquid crystal layer. As previously explained, the voltage is a function of the writing light intensity. It may be seen that in each figure three curves are presented which represent the transmission for each of the three primary colors; red, green and blue. In FIG. 5a, red, green and blue are respectively represented by curves 70, 72 and 74, whereas in FIG. 5b, these colors are respectively represented by curves 76, 80 and 78. In each of the figures, the different colors have different curves because the transmission is dependent upon the wavelength of the projection light.

In FIG. 5a, the data was calculated for a 3.0 micrometer thick liquid crystal layer and a 45° liquid crystal twist angle ($\alpha=45°$). The polarizer was oriented parallel to the liquid crystal preferred orientation on the entrance electrode ($\beta=0$) and the analyzer was perpendicular to the polarizer, as shown in FIG. 4a. This curve is similar to the one given in FIG. 4 of the Bleha et al, 1977 SID Processings article previously referenced.

In FIG. 5b, the data was calculated for a liquid crystal layer which had the same twist angle and thickness as the light valve used for FIG. 5a. In accordance with the invention as shown in FIG. 4b, the polarizer was oriented at 25.0° to the liquid crystal preferred orientation on the entrance electrode ($\beta=25.0°$), and the analyzer was perpendicular to the polarizer.

Referring now to FIG. 5a, it is seen that the curves have a low transmission at low voltage and that beginning at voltage A the transmission begins to rise in a linear manner to a maximum level in the vicinity of voltage B. Operation of this device occurs in the linear region between voltage A, the off-state voltage, and voltage B, the maximum transmission voltage. It is important that the off-state transmission be low in order to produce a high contrast output image. While voltage setting A does provide low transmission in all three colors (and thus a near-achromatic off-state) and near-white transmission at voltage B, the ratio of the color components at a given voltage level varies substantially over the A to B region. This gives the resulting imagery visually unpleasing color hues which, moreover, distractingly change with gray scale level. More specifically, over the gray scale region from A to B, the blue component increases from a very low intensity to a high intensity relative to blue and green. This causes the respective gray scale levels to change from black (at A) to yellow (just above A) to brown (midway between A and B) and finally to white (at B). The visually unpleasing yellow and brown colors and the visually distracting change in color as a function of gray scale, level make the device unsuitable for use with white projection light and thus limits its use to the display of monochromatic (red, green, or blue) gray scale images.

Still referring to FIG. 5a, it may be seen that for voltages beyond the vicinity of the transmission maximum at voltage B, a voltage can be found where the blue transmission becomes higher than the red and green and the ratio of the color components is nearly equal through the gray scale voltage range. Thus, in this voltage range the device transmission is nearly uniform with respect to the color of incident light. However, it is not possible to use this achromatic transmission region to project useful achromatic gray scale images because the voltage range between B and C is so great as to be beyond the voltage switching capability of presently used liquid crystal devices. Furthermore, even with a liquid crystal device having the capability to switch between voltage B and C, the transmission at voltage C would still be too high to yield a high contrast image.

Thus, the inherent problems of displaying a TV image using a liquid crystal light valve operated in the hybrid field effect mode are that the high contrast gray scale output images are either monochromatic or of hues dependent on gray scale, and, as stated earlier, the images cannot be overlaid with color symbology.

Referring now to FIG. 5b, the manner in which these problems are alleviated by use of the novel orientation of the liquid crystal relative to the crossed polarizer and analyzer, as shown in FIG. 4b becomes apparent. The curves show that the device transmits the three primary colors red, bue and green, (curves, 76, 78, 80, respectively) comprsing white light with a predominance of blue from a maximum transmission at voltage G to zero transmission at voltage H. This predominance of blue, (and the insensitivity of the human eye to blue) gives a pleasing blue-black hue to the intermediate gray scale levels. In addition, over the voltage range G through H, the ratio of the color components is similar, thereby producing a desirably constant tint over the range of gray scale levels. Thus, the eye perceives visually pleasing and substantially neutral (even though blue tinted) shades of gray over the range from white to black. In addition, the minimum transmission at voltage H is nearly zero, resulting in high contrast images. Importantly, this maximum to minimum transmission occurs over a much lower voltage range than the maximum to minimum transmission range extending from voltage B to C shown in FIG. 5a for the hybrid field effect device. The lower voltage range of the present invention is well within the voltage switching capabilities of presently used liquid crystal devices. The significance of this neutral gray scale and lower voltage range is that for the first time it makes it possible to use a twisted neumatic liquid crystal device to project high contrast blue-black and white, (rather than just monochromatic) images having a gray scale. Thus, an input writing light image having an intensity range which produces a voltage range between G and H volts will result in a white light projection beam displaying an output image having a gray scale ranging from white (at voltage G) to deep blue-black (at voltage H). In other words, the color of the image is nearly the color of the projection beam incident on the light valve, because the device transmission is approximately constant with wavelength (achromatic).

The beneficial effect of a transmission dark state occuring at a relatively low voltage H over a broad wavelength range has been observed for light valves with liquid crystal layers ranging from 2.0 to 6.0 micrometers thick. As a result, the dark state transmission is achieved in the present invention without the need for precise thickness control, enabling the device to be more easily fabricated.

The dark state at voltage H resulting from the novel orientation shown in FIG. 4b is unexpected because it is contrary to the known prior art which taught that for the system configuration of FIG. 4b, the molecular orientation must be perpendicular to the electrode surfaces in order to obtain zero transmission. In the present invention, voltage H is known to be too low to produce this perpendicular orientation. The question then is: What causes this beneficial low-voltage dark state even though the molecules are not perpendicular to the electrodes? While the answer is not yet completely known, it is hypothesized that this lower voltage dark state results from a destructive interference effect between the phases of the light traveling along the ordinary and extraordinary axes of the liquid crystal.

The color symbology mode is another mode of operation that can be achieved by operating between the voltage range extending from D to G. As may be seen in FIG. 5b, the transmission curves within this range vary with color. Thus, an input writing light image having a range of intensity levels results in white projection light producing various colors in the output image. For example, at a voltage D where red and blue transmit at a minimum and green transmits at a maximum, green light would be projected. Changing to voltage E, where green is at a minimum, some red and blue would be transmitted and a magenta colored image would be projected. At voltage F, red and green with little blue is transmitted to yield a yellow projected image.

Figure 6:
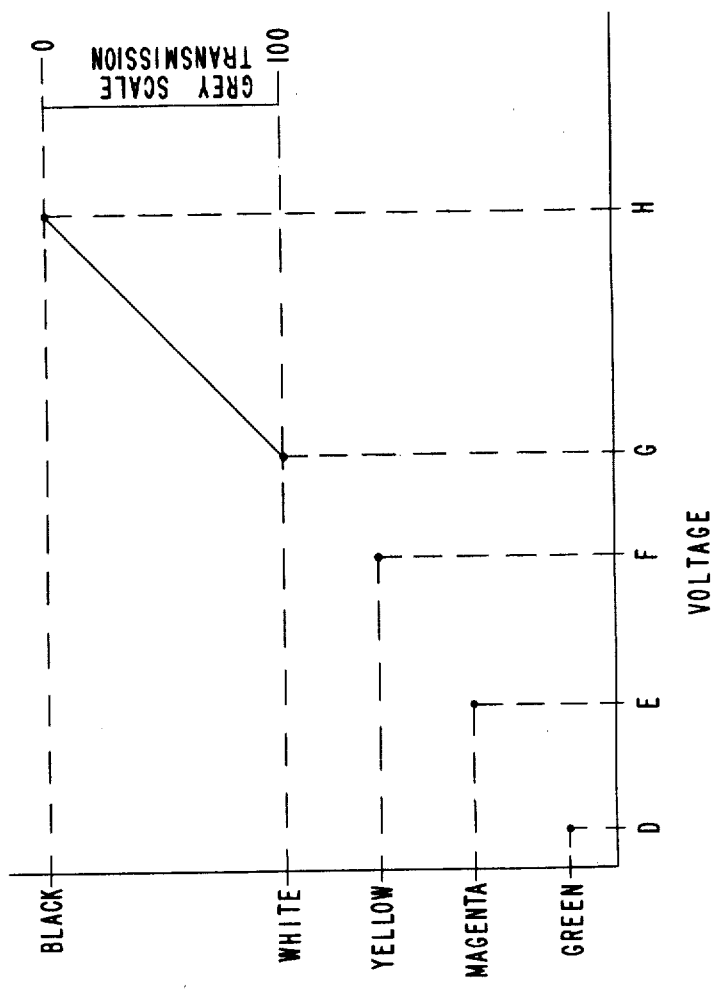
FIG. 6 is a graph showing for the present invention the activation of color symbology and black-white gray scale images as a function of applied voltages.

The operation of the invention in the achromatic mode and in the color symbology mode has been described. As will now become clear, these two modes of operation can be combined in accordance with the present invention in order to produce a multi-mode image display in which color symbology overlie the achromatic gray scale image. FIG. 6 schematically illustrates this multi-mode operation using white projection light. The horizontal axis is the voltage applied across the liquid crystal layer. The left-hand vertical axis represents the color component of white projection light transmitted by the multimode light valve system. The right-hand vertical axis represents percentage of transmitted projection light when the light valve is operated between voltages G and H. Because FIG. 6 is derived from FIG. 5b, the voltages shown in FIG. 6 are the same as those in FIG. 5b.

It should be emphasized that, in operating the invention depicted in FIGS. 1, 2, 3a, 3b, 4b, and 5b, the voltage appearing across the liquid crystal layer 30 is modulated not by the voltage supply 34, but rather by the intensity of the writing light 12 that is imaged on a given area of the photoresponsive layer 20. This writing light, by photo-modulating the impedance of the photoresponsive layer, determines how much voltage is switched from the photoresponsive layer to the liquid crystal layer. The greater the intensity of writing light, the greater is the voltage switched from the given area of the photoconductor which is illuminated by the writing light to the adjacent area of the liquid crystal layer.

Referring again to FIG. 6, adjustment of the bias voltage supply 34 to a fixed voltage D prepares the device for multi-mode operation. With no writing light present, the lowest level color of light shown in FIG. 6, green light, will be projected. Selecting a writing light intensity that produces a voltage E will cause the next higher level color, magenta, to be projected. Finally, selecting a writing light intensity that produces a voltage F will cause the next level of color, yellow, to be projected.

Hence, applying a writing light input image having three levels of intensity (including zero intensity level) to the photoresponsive face of the light valve will result in the white light projection beam displaying a three color image, one color for each intensity level at the input.

Similarly, if the writing light input image has a second intensity range that produces a voltage range between G and H volts, a blue-black and white gray scale output image will be transmitted whose intensity, is a function of the second intensity range. Of course, this second intensity range has higher intensity levels than those used for the color symbology display.

Alternatively, the multi-mode field effect light valve can be used for projection of achromatic gray scale images without the use of color symbology. To accomplish this, the bias voltage supply 34 is adjusted to a fixed voltage G. With no writing light present, transmission of the white projection light is thereby a maximum. Transmission decreases with increasing voltage until the dark state transmission is reached at a voltage H.

A practical problem that can be overcome is the contrast reversal of an achromatic gray scale image relative to the input image. This reversal occurs because, as can be seen with reference to FIGS. 5a or 6, transmission decreases with increasing writing light intensity in the G to H voltage range used for gray scale image projection. This problem can be solved in at least three conventional ways. First, the image from a photographic negative can be projected onto the photoresponsive face of the light valve. The resulting output image will have a positive contrast. Secondly, if the source of writing light is a cathode ray tube, the contrast inversion can be accomplished by using conventional electronic circuitry to invert the contrast of the image appearing on the CRT and thereby yield an output image of positive contrast. A third method of contrast reversal is achieved by setting the analyzer axis parallel to the polarizer axis.

In its present state of development, the multimode field effect light valve has produced output images having 10 shades of gray at a contrast ratio of 40:1 with magenta, yellow and green multi-color symbols. In actual practice, the dark state transmission is minimized by adjusting the light valve orientation relative to the crossed polarizer and analyzer over a small range of angles in the region of $\beta = 22.5$ degrees.

There has thus been described a method of, and apparatus for, operating an improved optical system for a large scale image display using a single liquid crystal light valve. The improved image display system achieves, by means of a unique orientation of a twisted nematic liquid crystal light valve relative to the crossed polarizer and analyzer, a display of blue-black and white gray scale television images with a light valve having a longer operating lifetime than the light valve disclosed in U.S. Pat. No. 4,127,322. In addition to this improvement, the blue-black and white gray scale image can be overlaid with multi-color symbology. Moreover, the light valve is no harder to make than conventional twisted nematic liquid crysal light valves because the thickness of the liquid crystal layer does not have to be precisely tuned in order to obtain minimum dark state transmission.

What is claimed is:

1. In a method of displaying an image wherein a writing light input image modulates a polarized projection beam with an electric field driven hybrid field effect liquid crystal light valve, said light valve having a nematic liquid crystal structure helically twisted through an acute angle, the multi-mode field effect improvement comprising the steps of:
   (a) orienting the polarization direction of said projection beam incident on said light valve to fall within said acute angle of said liquid crystal structure; and
   (b) adjusting the magnitude of said electric field applied across said liquid crystal layer so that predetermined intensity levels of said input image modulates said projection beam to produce one of: (a) a simultaneous display of color symbology and achromatic gray scale images and (b) a separate display of one of them, said orienting of said projection beam polarization being such that, as said magnitude of said electric field is increased beyond a predetermined value, transmission of white light through said light valve is reduced to substantially zero.

2. The method as in claim 1 wherein the magnitude of said electric field is set to at least first and second fixed values,
   (a) the first fixed value being such that a writing light input image having first and second intensity ranges results in said projection beam displaying:
      (1) a multicolor output image whose colors are a function of said first intensity range, and
      (2) an achromatic gray scale output image whose intensity range is a function of said second intensity range,
   (b) the second fixed value of said electric field being such that a writing light input image having a given intensity range results in said projection beam displaying an achromatic gray scale output image whose intensity range is a function of said given intensity range.

3. The method as in claim 2 wherein said second value of said electric field is greater than said first value and the intensity levels of said second intensity range are greater than the intensity levels of said first intensity range.

4. In a method of displaying an image wherein a writing light input image modulates a polarized projection beam with an electric field driven hybrid field effect liquid crystal light valve, said light valve having a nematic liquid crystal structure helically twisted through an acute angle, the multi-mode field effect improvement comprising the steps of:
   (a) orienting the polarization direction of said projection beam incident on said light valve to fall within said acute angle of said liquid crystal structure; and
   (b) adjusting the magnitude of said electric field applied across said liquid crystal layer to a value such that a writing light input image having first and second intensity ranges, wherein the intensity levels of said second range are greater than the intensity levels of said first range, results in said projection beam displaying:
      (1) a multicolor output image whose colors are a function of said first intensity range, and
      (2) an achromatic gray scale output image whose intensity range is a function of said second intensity range, said orienting of said projection beam polarization being such that, as said magnitude of said electric field is increased beyond a predetermined value, transmission of white light through said light valve becomes substantially zero.

5. In a method of displaying an image wherein a writing light input image modulates a polarized projection beam with an electric field driven hybrid field effect liquid crystal light valve, said light valve having a nematic liquid crystal structure spirally twisted through an acute angle, the multi-mode field effect improvement comprising the steps of:
   (a) orienting the polarization direction of said projection beam incident on said light valve to fall within said acute angle of said liquid crystal structure; and
   (b) adjusting the magnitude of said electric field applied across said liquid crystal layer to a value such that a writing light input image having a given intensity range results in said projection beam displaying an achromatic gray scale output image whose intensity range is a function of said given intensity range, said orienting of said projection beam polarization being such that, as said magnitude of said electric field is increased beyond a predetermined value, transmission of white light through said light valve is reduced to substantially zero.

6. The method as in claims 1, 2, 3 or 4 wherein said projection beam polarization direction bisects said acute angle.

7. The method as in claims 1, 2, 3 or 4 wherein said acute angle is 45°.

8. A system for displaying an image wherein a writing light input image modulates a polarized projection beam with an electric field driven hybrid field effect liquid crystal light valve, said light valve having a nematic liquid crystal structure helically twisted through an acute angle, said system being characterized by improvements for producing either a simultaneous display of color symbology and achromatic gray scale images or a separate display of either one of them, said improvments residing in:
   (a) means for orienting the polarization direction of said projection light incident on said light valve to fall within said acute angle of said liquid crystal structure; and
   (b) means for adjusting the magnitude of said electric field applied across said liquid crystal layer to at least first and second values, such that
      (1) the first value produces
         (i) a multicolor output image and, (ii) an achromatic gray scale output image, and, (2) the second fixed value produces an achromatic gray scale output image, said orienting of said projection beam polarization being such that, as said magnitude of said electric field is increased beyond a predetermined value, transmission of white light through said light valve is reduced to substantially zero.

9. A system for displaying an image wherein a writing light input image modulates a polarized projection beam with an electric field driven hybrid field effect liquid crystal light valve, said light valve having a nematic liquid crystal structure helically twisted through an acute angle, said system being characterized by improvements for producing either a simultaneous display of color symbology and achromatic gray scale images or a separate display of either one of them, said improvements residing in:

(a) means for orienting the polarization direction of said projection light incident on said light valve to fall within said acute angle of said liquid crystal structure; and (b) means for adjusting the magnitude of said electric field applied across said liquid crystal layer to at least first and second values, said second value being greater than said first value, (1) the first fixed value being such that a writing light input image having first and second intensity ranges, wherein the intensity levels of said second range are greater than the intensity levels of said first range, results in said projection beam displaying:

(i) a multicolor output image whose colors are a function of said first intensity range, and (ii) an achromatic gray scale output image whose intensity range is a function of said second intensity range, (2) the second value of said electric field being such that a writing light input image having a given intensity range results in said projection beam displaying an achromatic gray scale output image whose intensity range is a function of said given intensity range, said orienting of said projection beam polarization being such that, as said magnitude of said electric field is increased beyond a predetermined value, transmission of white light through said light valve is reduced to substantially zero.

10. A system for displaying an image having:

(A) an electric field driven liquid crystal light valve of the type having a plurality of adjacent functional layers arranged in the sequential order of:

(B) a first transparent conductive electrode, a photoresponsive layer, a reflective layer, a first transparent insulating layer, a nematic liquid crystal layer characterized by first and second surfaces, a second transparent insulating layer and a second transparent conductive electrode, wherein said liquid crystal layer is characterized by a molecular structure such that, in the absence of said electric field, the long axes of the liquid crystal molecules are in spirally twisted alignment with respect to one another, molecules adjacent to said first surface having said axes oriented in a first direction parallel to said first surface, and molecules adjacent to said second surface have said axes oriented in a second direction parallel to said second surface so that said first and second directions intersect at an acute angle when orthogonally projected onto a plane parallel to either of said surfaces;

(C) means for applying an alternating electric field across said first and second electrodes;

(D) means for projecting polarized projection light through said second transparent electrode in order to traverse said liquid crystal layer, reflect from said reflecting means, and retraverse said layers;

(E) means for projecting external writing light images through said first transparent electrode onto said photoresponsive layer, and (F) means for transmitting only that component of said projection light exiting said second face of said liquid crystal layer having a given polarization state in order to form an output image;

said system being characterized by improvements permitting it to produce either a simultaneous display of color symbology and achromatic gray scale images or a separate display of either one of them, said improvements residing in:

(a) means for orienting the polarization direction of said projection light entering said second surface of said liquid crystal layer so that the orthogonal projection of said polarization direction on said plane parallel to either of said surfaces falls within said acute angle between said orientation directions, and;

(b) means for adjusting the magnitude of said electric field applied across said liquid crystal layer to at least first and second values, said second value being greater than said first value, (1) the first value being such that a writing light input image having first and second intensity ranges, wherein the intensity levels of said second range are greater than the intensity levels of said first range, results in said transmitting means passing:

(i) a multicolor output image whose colors are a function of said first intensity range, and (ii) an achromatic gray scale output image whose intensity range is a function of said second intensity range, (2) the second value of said electric field being such that a writing light input image having a given intensity range results in said transmitting means passing an achromatic gray scale output image whose intensity range is a function of said given intensity range, said orienting of said projection beam polarization being such that, as said magnitude of said electric field is increased beyond a predetermined value, transmission of white light through said light valve is reduced to substantially zero.

11. A system as in claim 8 wherein said projection light polarization direction bisects said acute angle.

12. A system as in claims 8 or 9 wherein said acute angle is 45°.

13. A system as in claims 8 or 9 wherein said polarized projection light is linearly polarized.

14. A system as in claim 10 wherein said means for transmitting said polarized light is a linear polarizer having its polarization direction at approximately 90° with respect to said polarization direction of said entering projection light.

15. A system as in claim 10 wherein said liquid crystal layer has a thickness of less than 4 microns.

16. A system as in claim 10 wherein said nematic liquid crystal layer is of positive dielectric anisotropy.

17. A liquid crystal light valve comprising:
- a liquid crystal layer having two opposite faces and comprising a plurality of birefringent liquid crystal molecules having major optical axes, said optical axes being nematically twisted through an angle $\alpha$ along an axis passing through said two faces;
- means for applying an electric field across said two liquid crystal faces; and
- means for applying a projection beam having a polarization direction to one of said two opposite faces, including means for orienting said polarization direction to be within said angle $\alpha$ so that, as the potential of said electric field is increased to a certain voltage $V_h$, the transmission of light decreases to zero substantially simultaneously for all visible wavelengths of light.

18. The liquid crystal light valve of claim 17 wherein said electric field applying means include means responsive to an input image for controllably varying said potential of said electric field between said voltage $V_h$ and a black/white "on" voltage $V_g$ less than $V_h$.

19. The liquid crystal light valve of claim 17 wherein said electric field applying means include means responsive to an input image for controllably varying the potential of said electric field between said voltage $V_h$ and a voltage comprising a selected one of a group of voltages including $V_d$, $V_e$, $V_f$ each being less than $V_h$ and corresponding respectively to a maximum transmission through said liquid crystal layer by one of a corresponding group of wavelengths of visible light including $\lambda_d$, $\lambda_e$, $\lambda_f$, respectively.

20. The liquid crystal light valve of claim 17 wherein said orienting means orients said polarization direction so that said voltage $V_h$ is within a practical switching range.

21. A liquid crystal light valve comprising:
- a liquid crystal layer having two opposite faces and comprising a plurality of birefringent liquid crystal molecules having major optical axes, said optical axis being nematically twisted through an angle $\alpha$ along an axis passing through said two faces;
- means for applying an electric field across said two liquid crystal faces;
- means for applying a projection beam having a polarization direction to one of said two opposite faces, including means for orienting said polarization direction with respect to said angle $\alpha$, so that, as the potential of said electric field is increased to a certain voltage $V_h$, the transmission of light decreases to zero substantially simultaneously for all wavelengths of visible light, wherein said orienting means orients said polarization direction so that the voltage $V_h$ is within a practical switching range.

22. A liquid crystal light valve of claim 21 wherein said orienting means orients said polarization direction to be within said angle $\alpha$.

23. The liquid crystal light valve of claims 17 or 21 wherein said electric field applying means include:
- means responsive to an input image for controllably varying the potential of said electric field between said voltage $V_h$ and a black/white "on" voltage $V_g$ which is less than $V_h$; and
- means responsive to an input image for controllably varying the potential of said electric field between said voltage $V_h$ and a voltage from a selected one of a group of voltages including $V_d$, $V_3$, $V_f$, each being less than $V_h$ and corresponding respectively to a maximum transmission through said liquid crystal layer by one of a corresponding group of wavelengths of visible light including $\lambda_d$, $\lambda_e$, $\lambda_f$, respectively, wherein said group of voltages lies substantially between O and $V_g$.

24. A liquid crystal light valve comprising:
- a liquid crystal layer having two opposite faces and comprising a plurality of birefringent liquid crystal molecules having major optical axes, said optical axes being nematically twisted through an angle $\alpha$ along an axis passing through said two faces;
- means for applying an electric field across said two liquid crystal faces; and
- means for polarizing a projection beam illuminating one of said two opposite faces, such that, as the potential of said electric field is increased to a certain voltage $V_h$, the transmission of visible light decreases to zero substantially simultaneously for all visible wavelengths of light.

25. A liquid crystal light valve of claim 24 wherein the direction of said polarizing lies within said angle $\alpha$.

26. The device of claims 21, 22, 24, or 25 wherein said electric field applying means include means responsive to an input image for controllably varying the potential of said electric field between said voltage $V_h$ and a black/white "on" voltage $V_g$ less than $V_h$.

27. The liquid crystal light valve of claims 21, 22, 24 or 25 wherein said electric field applying means includes means responsive to an input image for controllably varying the potential of said electric field between said voltage $V_h$ and a voltage from a selected one of a group of voltages including $V_d$, $V_e$, $V_f$ each being less than $V_h$ and corresponding respectively to a maximum of transmission through said liquid crystal layer by one of a corresponding group of wavelengths of visible light including $\lambda_d$, $\lambda_3$, $\lambda_f$ respectively.

* * * * *